United States Patent
Tanaka et al.

(10) Patent No.: US 7,724,533 B2
(45) Date of Patent: May 25, 2010

(54) ELECTRONIC APPARATUS

(75) Inventors: Kaigo Tanaka, Kawasaki (JP);
Sonomasa Kobayashi, Kawasaki (JP);
Yusuke Mizuno, Kawasaki (JP);
Yukihiro Ueki, Tokyo (JP); Minoru Suzuki, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/976,761

(22) Filed: Oct. 26, 2007

(65) Prior Publication Data
US 2008/0055840 A1   Mar. 6, 2008

Related U.S. Application Data

(63) Continuation of application No. PCT/JP2005/008078, filed on Apr. 27, 2005.

(51) Int. Cl.
*H05K 5/00* (2006.01)
(52) U.S. Cl. .................. 361/752; 361/801
(58) Field of Classification Search ........ 361/683, 361/686, 801, 802, 755, 740, 752; 312/223.1–223.6; 248/917
See application file for complete search history.

(56) References Cited

U.S. PATENT DOCUMENTS

| | | | |
|---|---|---|---|
| 5,677,827 A * | 10/1997 | Yoshioka et al. | 361/683 |
| 6,191,941 B1 * | 2/2001 | Ito et al. | 361/683 |
| 6,233,141 B1 * | 5/2001 | Lee et al. | 361/683 |
| 6,768,637 B1 | 7/2004 | Amemiya | |
| 2003/0053289 A1 * | 3/2003 | Tanaka et al. | 361/683 |
| 2008/0055839 A1 * | 3/2008 | Lin et al. | 361/683 |
| 2008/0062633 A1 * | 3/2008 | Yamaguchi et al. | 361/683 |

FOREIGN PATENT DOCUMENTS

| | | |
|---|---|---|
| CN | 2444266 Y | 8/2001 |
| JP | 5-57875 | 7/1993 |
| JP | 6-282365 | 10/1994 |
| JP | 8-101731 | 4/1996 |
| JP | 2000-132275 | 5/2000 |
| JP | 2000-330672 A | 11/2000 |
| JP | 2003-91335 | 3/2003 |
| JP | 2003-323946 | 11/2003 |

OTHER PUBLICATIONS

English language version of the International Search Report (PCT/ISA/210) mailed on Aug. 2, 2005 in connection with International Application No. PCT/JP2005/008078.

(Continued)

*Primary Examiner*—Jeremy C Norris
*Assistant Examiner*—Yuriy Semenenko
(74) *Attorney, Agent, or Firm*—Fujitsu Patent Center (57) ABSTRACT

A removable unit is designed to enjoy a change of attitude relative to an apparatus body. The apparatus body is received on the surface of a desk at first rubber pads. The removable unit has a pair of second rubber pads on its bottom surface located at a position adjacent to the bottom surface of the apparatus body. The bottom surface of the electronic apparatus is in this manner spaced from the surface of the desk. When a piece of paper is inserted between the second rubber pad and the surface of the desk, the change of attitude of the removable unit allows the other second rubber pad to contact the surface of the desk. The removable unit absorbs the difference of elevation based on the change of attitude. The removable unit allows the second rubber pads to contact. The electronic apparatus suffers from less rattling.

15 Claims, 9 Drawing Sheets

OTHER PUBLICATIONS

Chinese Office Action, mailed Mar. 13, 2009, by the Chinese Intellectual Property Office in connection with corresponding CN Application No. 200580049632.6.

Office Action, Japan Patent Office, mailed Mar. 2, 2010, in connection with corresponding JP patent application No. 2007-514426. Partial English-language translation.

* cited by examiner

ELECTRONIC APPARATUS

CROSS REFERENCE TO RELATED APPLICATION

This application is a continuing application, filed under 35 U.S.C. §111(a), of International Application PCT/JP2005/008078, filed Apr. 27, 2005, the entire contents of which are incorporated herein by reference.

BACKGROUND OF THE INVENTION

1. Field of the Invention

The present invention relates to an electronic apparatus such as a notebook personal computer, for example.

2. Description of the Prior Art

A notebook personal computer includes a main apparatus and a display unit coupled to the main apparatus for relative rotation, for example. A keyboard is placed on the front surface of the main apparatus. Front and rear pairs of rubber pads are attached to the bottom surface of the main apparatus, respectively. The notebook personal computer is received on the surface of the desk at these rubber pads. A user manipulates the keyboard to input commands and/or data to the notebook personal computer, for example.

When a piece of paper is inserted between the surface of the desk and one of the rubber pads, for example, the rubber pad adjacent to this rubber pad lifted up above the surface of the desk. When a user puts his palms on the main apparatus to type, the notebook personal computer inevitably rattles.

SUMMARY OF THE INVENTION

It is accordingly an object of the present invention to provide an electronic apparatus capable of reducing the possibility of rattling.

According to the present invention, there is provided an electronic apparatus comprising: an apparatus body; a removable unit attached to the apparatus body, the removable unit designed to enjoy a change of attitude relative to the apparatus body, the removable unit defining a bottom surface located at a position adjacent to the bottom surface of the apparatus body; a first foot or pad disposed on the bottom surface of the apparatus body; and a pair of second feet or pads disposed on the bottom surface of the removable unit at positions spaced from each other by a predetermined interval.

The electronic apparatus allows the apparatus body to be received on the surface of the desk at the first pad. The removable unit is received on the surface of the desk at a pair of the second pads. The bottom surfaces of the apparatus body and the removable unit are thus spaced from the surface of the desk. When a piece of paper is inserted between the surface of the desk and one of the second pads, for example, the second pad is received on the paper. Since the removable unit is allowed to enjoy a change of attitude relative to the apparatus body, the other second pad can be received on the surface of the desk. The removable unit is thus allowed to follow the difference of elevation based on the change of the attitude. The removable unit allows the second pads to contact. The apparatus body is received on the surface of the desk at the first pad. The electronic apparatus is thus received on the surface of the desk at the first and second pads. The electronic apparatus thus suffers from less rattling in this manner.

A keyboard may be incorporated in the front surface of the apparatus body in the electronic apparatus. The electronic apparatus may define a holding section in the front of the apparatus body. The removable unit may removably be set in the holding section. In this case, the removable unit can serve as a palm rest. The palms of a user can lie on the surface of the removable unit, for example. The weight of the palms of the user acts on the removable unit. The pair of second pads is thus allowed to reliably contact. The first and second pads may be rubber pads, for example. The removable unit can include a battery unit, for example.

The electronic apparatus may comprise: a guiding rail formed in the holding section; and a receiving groove formed in the removable unit to receive the guiding rail. The removable unit may realize the change of attitude within an extent of a gap defined around the guiding rail in the receiving groove.

The electronic apparatus may comprise: a receiving groove formed in the removable unit; a coupling piece received in the receiving groove; and an elastic member coupling the coupling piece with the holding section. Alternatively, the electronic apparatus may comprise: a guiding rail formed in the holding section; a receiving member designed to receive the guiding rail; and an elastic member coupling the receiving member with the removable unit. The elastic member enables a smooth change of attitude of the removable unit in the electronic apparatus. The electronic apparatus thus suffers from less rattling in the same manner as described above.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
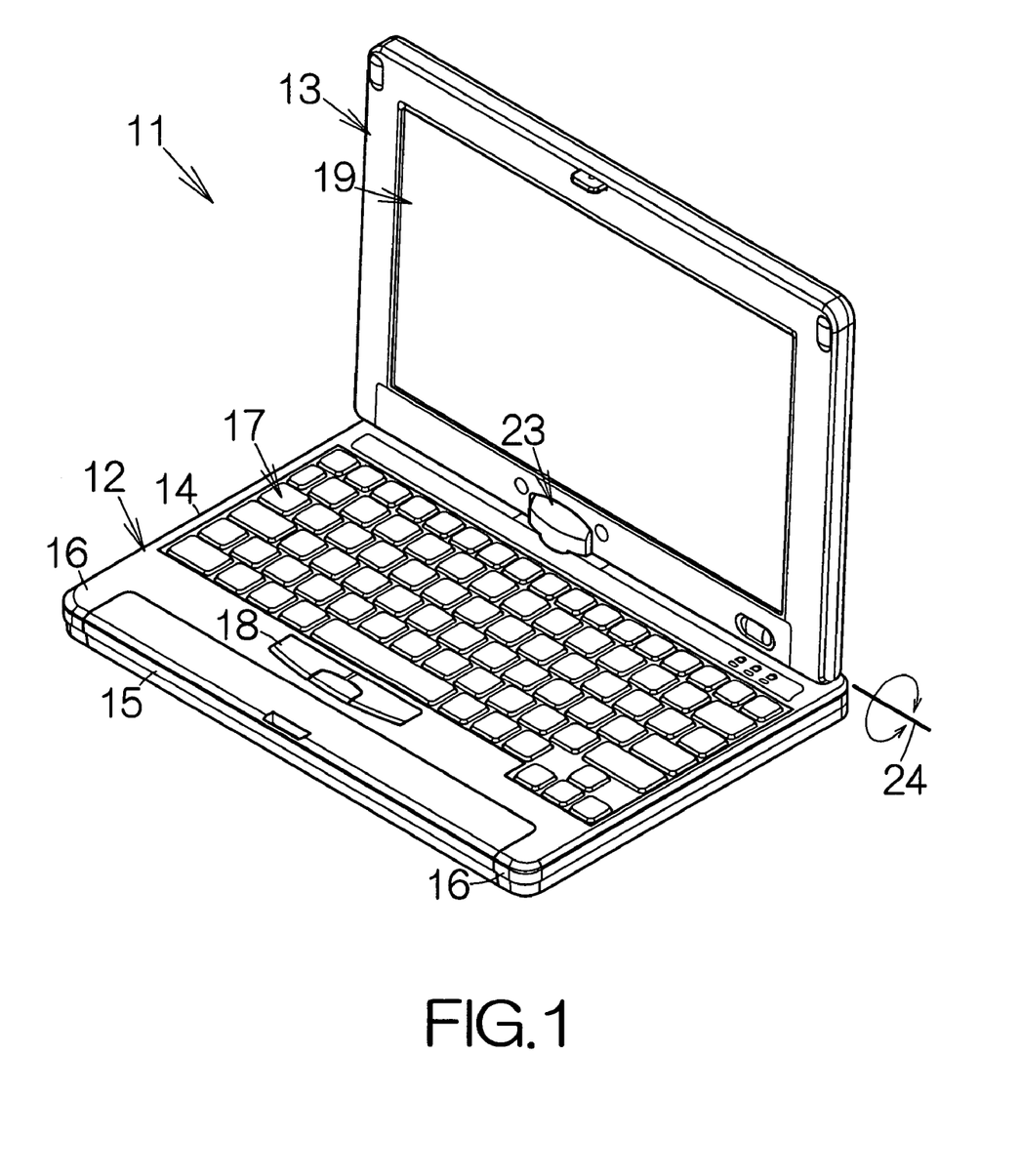
FIG. 1 is a perspective view schematically illustrating a notebook personal computer as an example of an electronic apparatus according to an embodiment of the present invention.

FIG. 1 schematically illustrates a notebook personal computer 11 as a specific example of an electronic apparatus according to an embodiment of the present invention. The notebook personal computer 11 includes a main apparatus 12 and a display unit 13. The display unit 13 is coupled to the main apparatus 12 at the rear edge of the main apparatus 12. The main apparatus 12 and the display unit 13 may be made of a reinforced resin material such as polycarbonate, for example.

The main apparatus 12 includes an apparatus body 14. A motherboard is enclosed in the apparatus body 14, for example. Electronic circuit elements such as a central processing unit (CPU), a memory, and the like, are mounted on the motherboard. The CPU is designed to execute various kinds of processing based on software programs and/or data temporarily held in the memory, for example. The software programs and the data may be stored in a large capacity storage apparatus, such as a hard disk drive (HDD), likewise enclosed in the apparatus body 14.

A removable unit, namely a battery unit 15, is removably coupled to the apparatus body 14. The battery unit 15 is supported on a pair of support members 16, 16 protruding forward from the front edge of the apparatus body 14. The support members 16, 16 are designed to extend in parallel with each other. The support members 16, 16 are formed integral with the apparatus body 14. The support members 16, 16 define a holding section in combination with the front end or front edge of the apparatus body 14. The battery unit 15 is set in the holding section. The battery unit 15 defines a front surface placed at a position adjacent to the front surface of the apparatus body 14. Storage batteries are incorporated in the battery unit 15, for example. The battery unit 15 serves to supply electric power to the apparatus body 14 and the display unit 13.

Input devices such as a keyboard 17 and input pads 18 are embedded in the front surface of the apparatus body 14. Users manipulate the keyboard 17 and/or the input pads 18 to input commands and/or data to the CPU. Since the battery unit 15 is placed in front of the front edge of the apparatus body 14, namely the keyboard 17 at a position closer to the users, the users can rest their palms on the battery unit 15 during the input of commands and/or data, for example. The front surface of the battery unit 15 can be utilized as a palm rest in this manner.

The display unit 13 includes a flat display panel such as a liquid crystal display (LCD) panel 19, for example. The screen of the LCD panel 19 is exposed on the surface of the display unit 13. Texts and graphics are displayed on the screen of the LCD panel 19 based on the processing of the CPU.

The main apparatus 12 and the display unit 13 are coupled to each other through a swivel mechanism 23. The swivel mechanism 23 allows the display unit 13 to rotate around a horizontal axis 24 relative to the main apparatus 12. The horizontal axis 24 is defined along the rear edge of the main apparatus 12 in parallel with the surface of the main apparatus 12. The display unit 13 is superimposed on the main apparatus 12 through the rotation around the horizontal axis 24. The surface of the display unit 13 is opposed to the surface of the main apparatus 12. The notebook personal computer 11 is folded in this manner.

Figure 2:
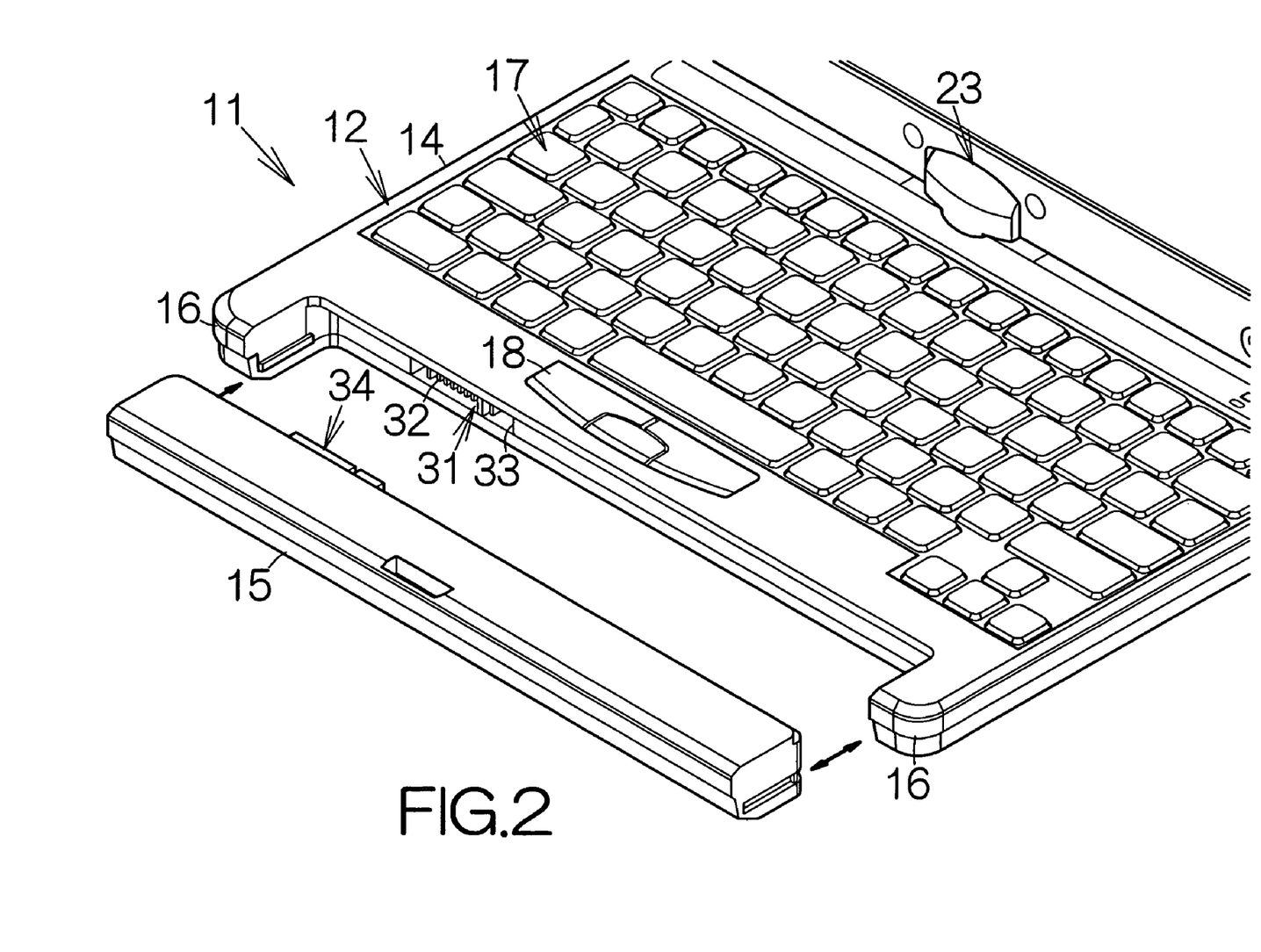
FIG. 2 is a partial perspective view of the notebook personal computer for schematically illustrating a battery unit removed from an apparatus body.

As shown in FIG. 2, the battery unit 15 can be removed from the apparatus body 14. The battery unit 15 is allowed to slide on the support members 16, 16, namely the apparatus body 14 in the back-and-forth direction, as described later in detail. The sliding movement of the battery unit 15 is realized along a plane parallel to the front surface of the apparatus body 14.

A connector 31 is disposed at the front edge of the apparatus body 14. The connector 31 is placed within an opening 33 defined in the front end of the apparatus body 14. The connector 31 is thus opposed to the front end of the battery unit 15. The connector 31 includes connecting terminals 32, 32, . . . each formed in the shape of a flat plate. The connecting terminals 32, 32, . . . respectively extend along planes perpendicular to the front surface of the apparatus body 14. A connector 34 is disposed at the front end of the battery unit 15. The connector 34 is opposed to the connector 31.

Figure 3:
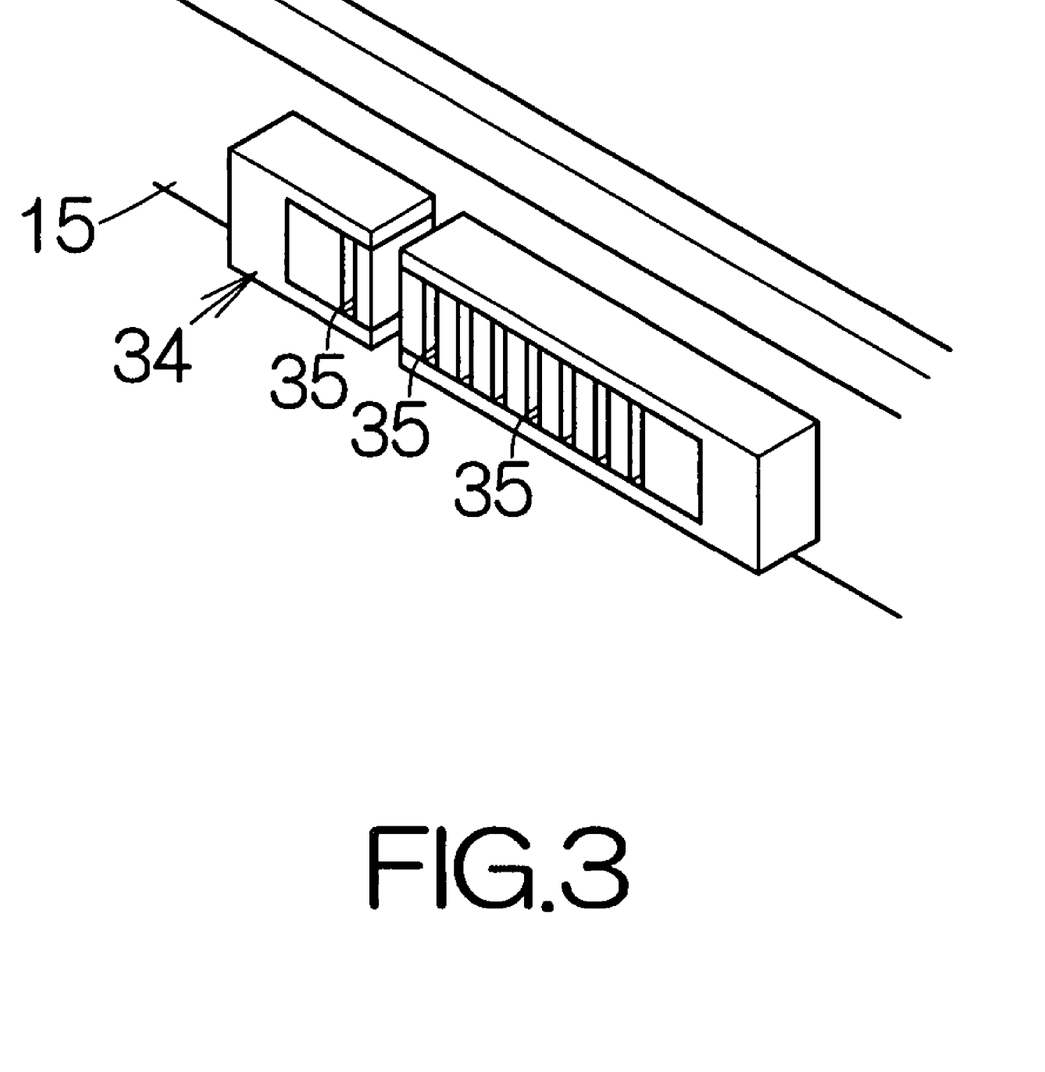
FIG. 3 is an enlarged partial perspective view of the battery unit for schematically illustrating a connector incorporated in the battery unit.

As shown in FIG. 3, the connector 34 includes connecting terminals 35, 35, . . . respectively formed along planes perpendicular to the surface of the battery unit 15. When the battery unit 15 is supported on the support members 16, 16, the connecting terminals 32 are received in the connecting terminals 35. The connectors 31, 34 are coupled with each other in this manner. The battery unit 15 is electrically connected to the apparatus body 14. Here, the connecting terminals 32 are movable in the corresponding connecting terminals 35.

Figure 4:
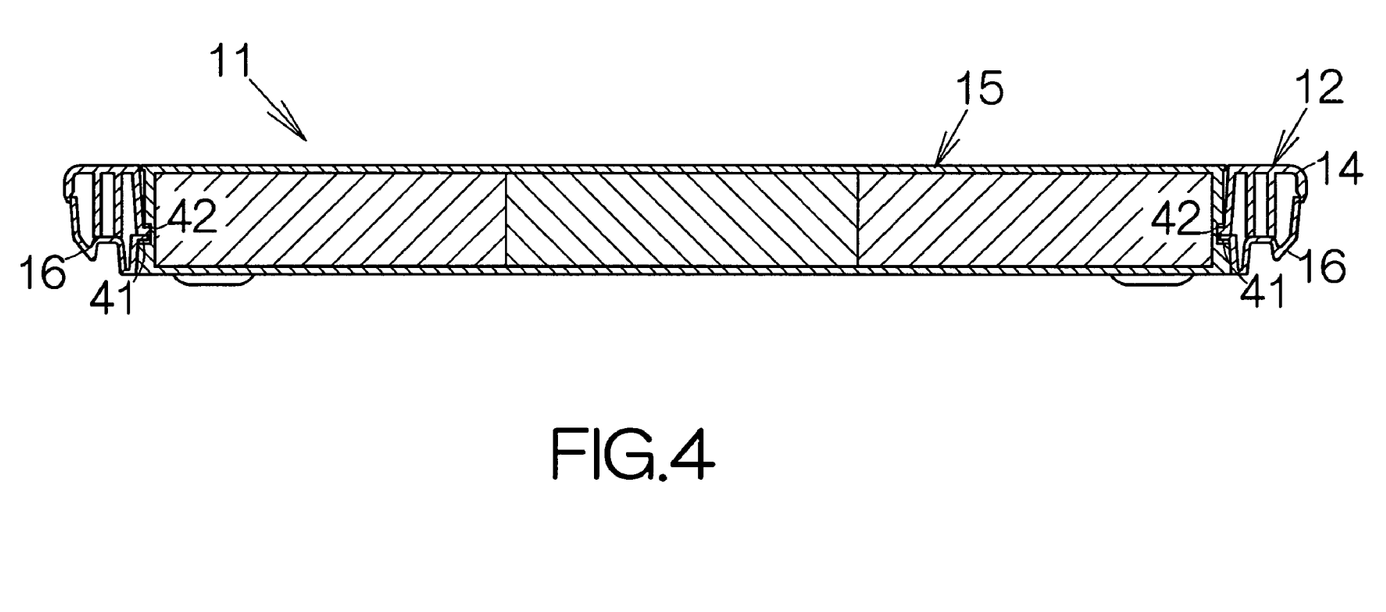
FIG. 4 is a vertical sectional view of a main apparatus for schematically illustrating the battery unit attached to the apparatus body.

As shown in FIG. 4, the battery unit 15 is interposed between the support members 16, 16. The support members 16, 16 respectively define surfaces opposed to each other. Guiding rails 41 are respectively supported on the opposed surfaces. The guiding rails 41, 41 protrude from the support members 16 toward the battery unit 15. The guiding rails 41, 41 extend in parallel with each other within a plane parallel to the front surface of the apparatus body 14.

The battery unit 15 includes receiving grooves 42, 42 formed in the surfaces opposed to the corresponding guiding rails 41, 41. The receiving grooves 42, 42 respectively receive the corresponding guiding rails 41. The receiving grooves 42, 42 extend in parallel with each other within a plane parallel to the front surface of the battery unit 15. The guiding rails 41 and the receiving grooves 42 in combination realize the sliding movement of the battery unit 15.

Figure 5:
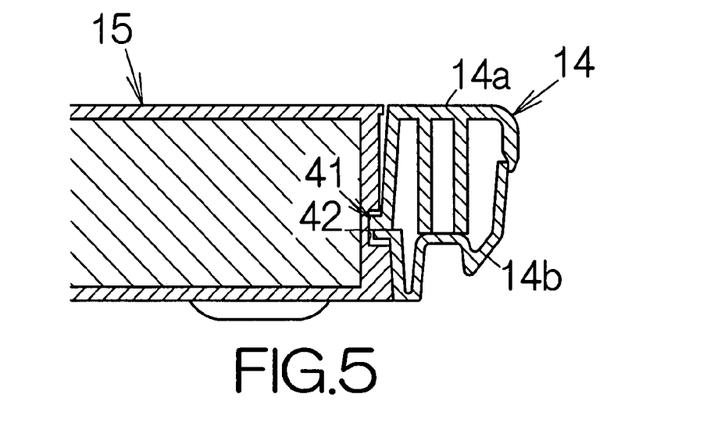
FIG. 5 is an enlarged partial vertical sectional view of the main apparatus for schematically illustrating the structure for coupling the apparatus body and the battery unit with each other according to a specific example.

As shown in FIG. 5, the apparatus body 14 includes a cover 14a and a base 14b coupled to the cover 14a. One edge of the cover 14a and one edge of the base 14b in combination form the guiding rails 41. A predetermined gap or gaps are defined adjacent to the guiding rail 41 in the corresponding receiving groove 42. The battery unit 15 is thus allowed to enjoy a change of attitude relative to the apparatus body 14. Specifically, the battery unit 15 realizes the change of attitude within an extent of the predetermined gap in the receiving grooves 42. Since the connecting terminals 32 are movable in the corresponding connecting terminals 35 as described above, the connection can be maintained between the connectors 31, 34 regardless of a change in the attitude of the battery unit 15.

Figure 6:
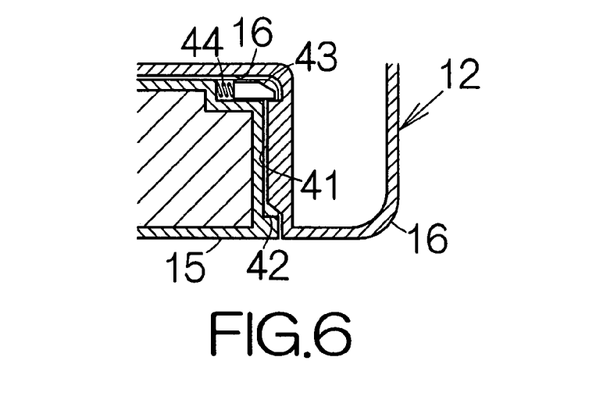
FIG. 6 is a partial sectional view of the main apparatus for schematically illustrating the battery unit attached to the apparatus body.

As shown in FIG. 6, a protruding piece 43 is disposed in each of the receiving grooves 42. The protruding piece 43 is coupled to the battery unit 15 for longitudinal movement relative to the receiving groove 42. A coil spring 44 is interposed between the protruding piece 43 and the battery unit 15. Here, since the elastic force of the coil spring 44 acting on the protruding piece 43 is supported on the support member 16, the protruding piece 43 is always held in the receiving groove 42. The guiding rail 41 is terminated at the root end of the support member 16. When the guiding rail 41 is completely received in the receiving groove 42, the elastic force of the coil spring 44 realizes engagement of the protruding piece 43 with the rear end of the guiding rail 41. The battery unit 15 is in this manner prevented from falling off from the apparatus body 14.

Figure 7:
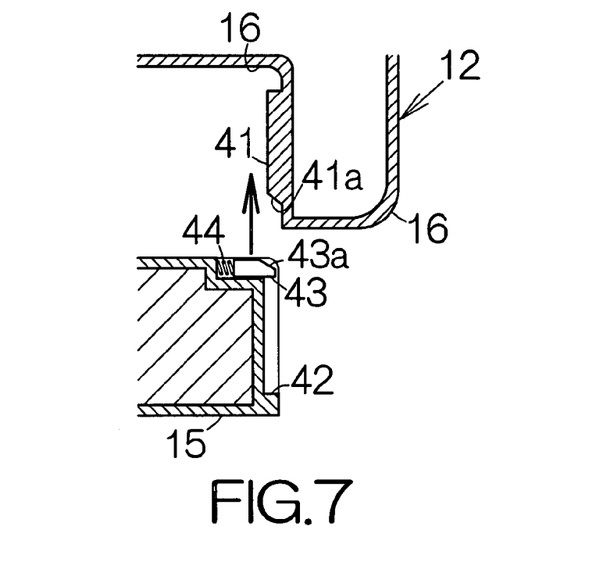
FIG. 7 is a partial sectional view of the main apparatus for schematically illustrating the battery unit removed from the apparatus body.

As shown in FIG. 7, an inclined surface 43a is defined on the side surface of the protruding piece 43. An inclined surface 41a is defined on the guiding rail 41 at the front end thereof. When the guiding rail 41 is received in the receiving groove 42, the inclined surface 43a of the protruding piece 43 contacts with the inclined surface 41a of the guiding rail 41. This allows the protruding piece 43 to retract into the battery unit 15 irrespective of the elastic force of the coil spring 44. When the battery unit 15 is pushed further into the apparatus body 14, the protruding piece 43 is allowed to protrude out of the receiving groove 42 based on the elastic force of the coil spring 44, as shown in FIG. 6. The protruding piece 43 is in this manner engaged with the rear end of the guiding rail 41.

Figure 8:
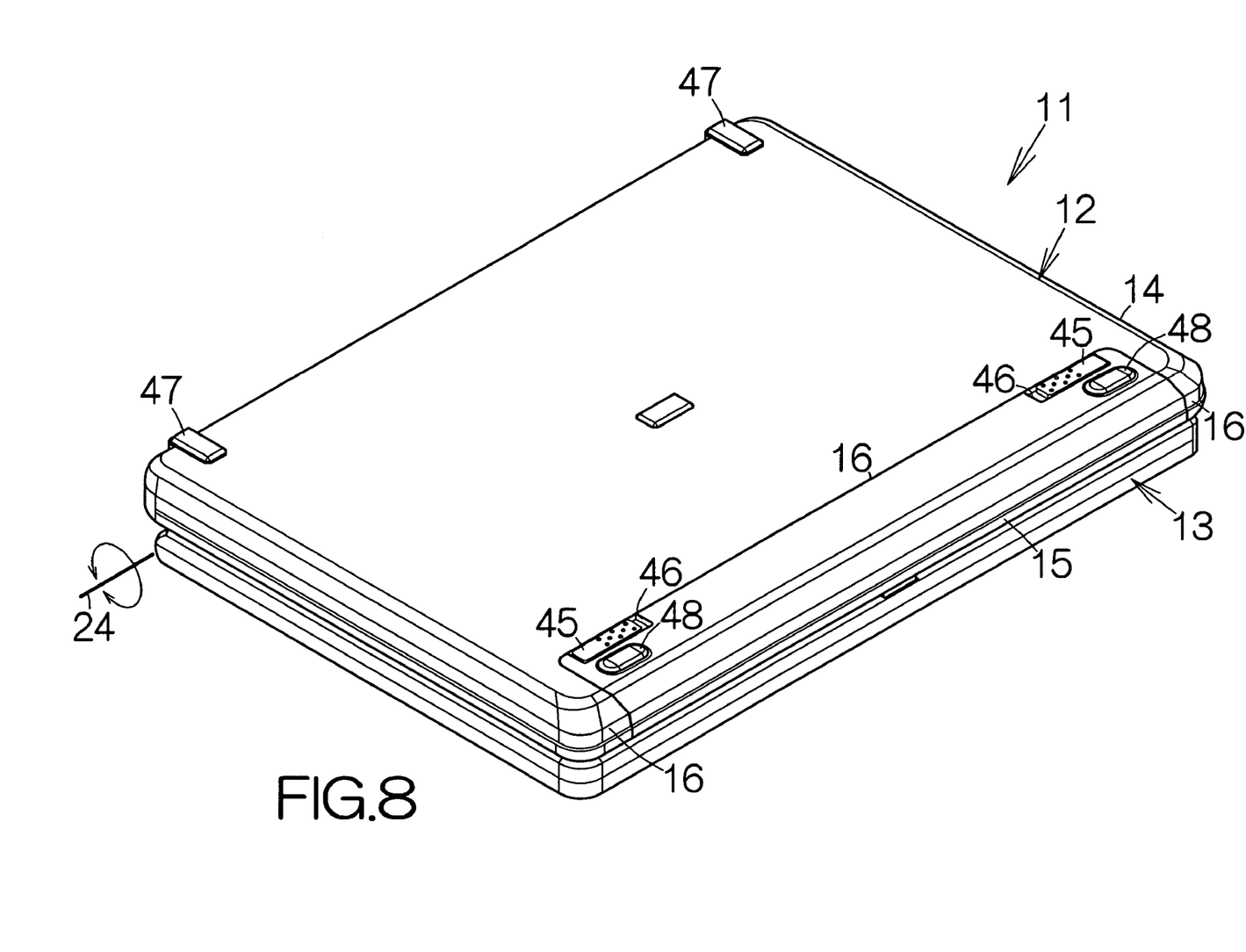
FIG. 8 is a perspective view schematically illustrating the bottom surface of the notebook personal computer.

As shown in FIG. 8, the battery unit 15 defines a bottom surface placed at a position adjacent to the bottom surface of the apparatus body 14. A pair of sliding buttons 45, 45 is incorporated in the bottom surface of the battery unit 15. The sliding buttons 45 are received in corresponding guiding depressions 46 defined on the bottom surface of the battery unit 15, respectively. When an operation force is applied to each of the sliding buttons 45, the sliding button 45 slides within the guiding depression in parallel with the horizontal axis 24 between a locking position and a releasing position.

The sliding buttons 45 are coupled to the protruding pieces 43, respectively. Sliding movement of the sliding button 45 leads to movement of the protruding piece 43. When the sliding button 45 is set at the releasing position based on the operation force, the protruding piece 43 retracts into the receiving groove 42 against the elastic force. The protruding piece 43 is withdrawn into the battery unit 15. The protruding piece 43 is released from engagement with the guiding rail 41 in this manner.

When the sliding button 45 is released from the operating force, the protruding piece 43 is allowed to protrude into the receiving groove 42 based on the elastic force of the coil spring 44. The sliding button 45 returns to the locking position. The protruding piece 43 engages with the rear end of the guiding rail 41. The battery unit 15 and the apparatus body 14 are thus kept coupled to each other.

A pair of first pads, namely first rubber pads 47, 47, is disposed on the bottom surface of the apparatus body 14. The first rubber pads 47, 47 may be arranged on a straight line at a predetermined interval. The straight line may be set in parallel with the horizontal axis 24, for example. The first rubber pads 47, 47 may be placed on the bottom surface of the apparatus body 14 at the rear corners of the bottom surface. The first rubber pads 47 may be made of an elastic resin material such as silicone or urethane rubber, for example. Here, a "rubber pad" includes a pad made of any material other than rubber.

A pair of second pads, namely second rubber pads 48, 48, is disposed on the bottom surface of the battery unit 15. The second rubber pads 48 are placed at positions adjacent to the support members 16, respectively. The second rubber pads 48 may also be made of an elastic resin material such as silicone or urethane rubber, for example. The first and second rubber pads 47, 48 serve to space the apparatus body 14 and the battery unit 15 from the surface of the desk, for example.

The display unit 13 is coupled to the rear edge of the apparatus body 14 in the notebook personal computer 11. The weight of the display unit 13 is thus applied to the apparatus body 14. The weight of the display unit 13 serves to allow the first rubber pads 47, 47 to reliably be received on the surface of the desk. Since the battery unit 15 serves as a palm rest, the weight of the hands of the user is applied to the battery unit 15. The weight of the hands likewise serves to allow the second rubber pads 48, 48 to reliably be received on the surface of the desk in this manner.

Figure 9:
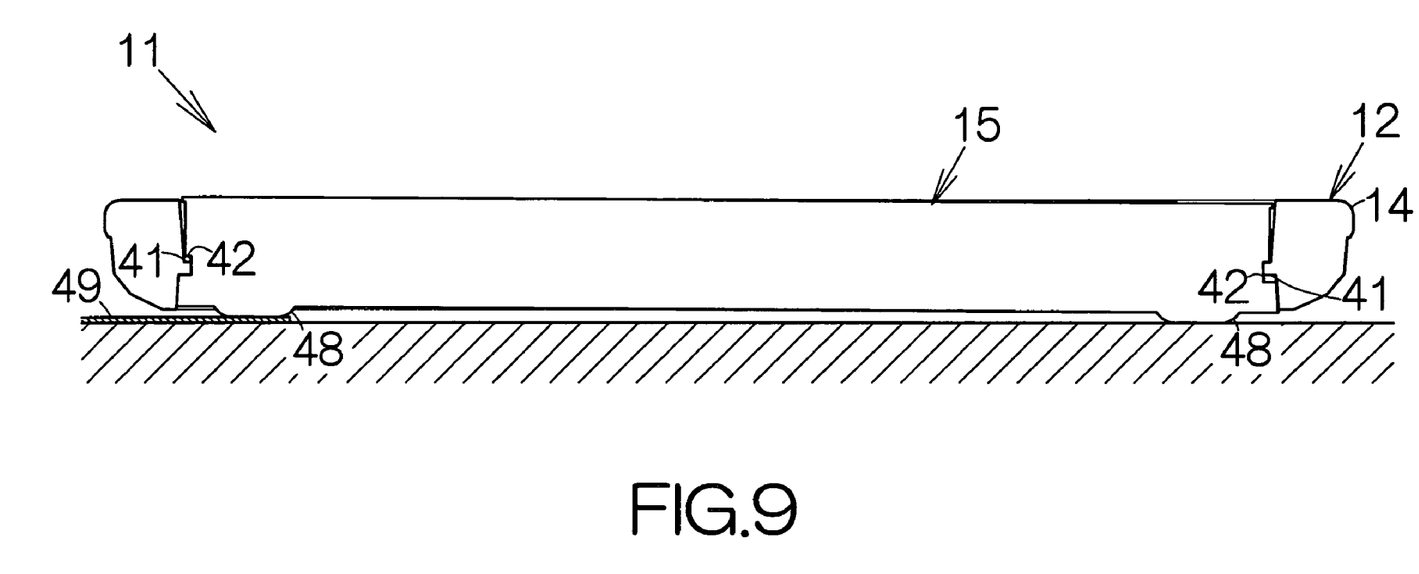
FIG. 9 is a schematic view of the main apparatus for illustrating a change in the attitude of the battery unit relative to the apparatus body.

Assume that a piece of paper 49 is inserted between the second rubber pad 48 and the surface of the desk, as shown in FIG. 9, for example. The apparatus body 14 is received on the surface of the desk at the first rubber pads 47, 47 based on the weight of the display unit 13. The attitude of the battery unit 15 changes relative to the apparatus body 14 based on the gap around the guiding rails 41 in the corresponding receiving grooves 42. The battery unit 15 is thus allowed to follow the difference of elevation based on the change of the attitude. The other second rubber pad 48 is received on the surface of the desk. The main apparatus 12 is received on the surface of the desk at the first and second rubber pads 47, 48. The notebook personal computer 11 is thus prevented from rattling.

In the case where the height of the paper is larger than the gap defined around the guiding rail 1 in the receiving groove 42, for example, the battery unit 15 cannot sufficiently absorb the difference of elevation based on the change of the attitude. When the user put their palms on the battery unit 15, the other second rubber pad 48 is lifted up from the surface of the desk. Even in such a case, since the battery unit 15 somewhat changes its attitude relative to the apparatus body 14, the distance between the second rubber pads 48, 47 and the surface of the desk is reduced in the notebook personal computer 11 as compared with a conventional apparatus not allowing such a change. The notebook personal computer 11 thus suffers from less rattling.

Protrusions may be formed in the main apparatus 12 in place of the first and second rubber pads 47, 48. The protrusions are designed to protrude from the bottom surfaces of the apparatus body 14 and the battery unit 15, for example. The protrusions may be formed integral with the apparatus body 14 and the battery unit 15. The first and second rubber pads 47, 48 serve to absorb impact when the notebook personal computer 11 is set or falls. The first and second rubber pads 47, 48 thus contribute to prevention of damage to the notebook personal computer 11. A single first rubber pad 47 may be placed on the intermediate position defined in the lateral direction of the apparatus body 14 in place of the pair of first rubber pads 47, 47.

Figure 10:
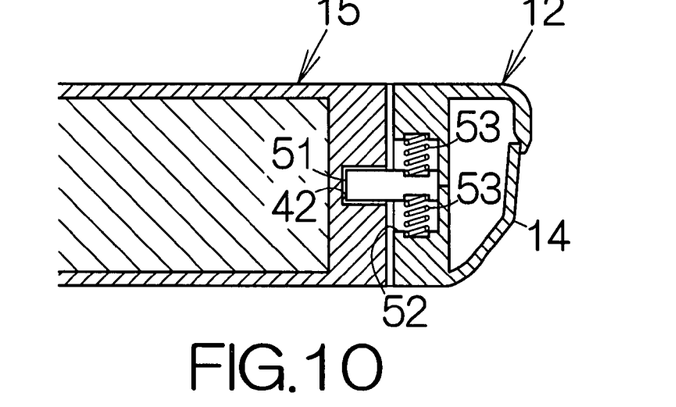
FIG. 10 is an enlarged partial vertical sectional view of the main apparatus for schematically illustrating the structure for coupling the apparatus body and the battery unit with each other according to a modification.

As shown in FIG. 10, a coupling piece 51 may be incorporated in the apparatus body 14 in place of the guiding rail 41. The coupling piece 51 is received in avoid 52 defined in the apparatus body 14. A pair of elastic members, such as coil springs 53, 53, may be utilized to couple the coupling piece 51 to the apparatus body 14, for example. The coil springs 53, 53 allow the coupling piece 51 to move within the void 52. The coupling piece 51 is received in the receiving groove 42 of the battery unit 15. The attitude of the battery unit 15 can thus be changed relative to the apparatus body 14 based on the movement of the coupling piece 51. Like reference numerals are attached to the structure or components equivalent to those of the aforementioned example.

Figure 11:
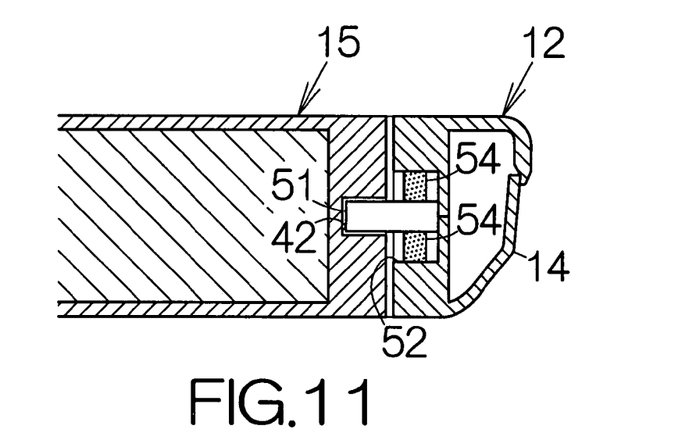
FIG. 11 is an enlarged partial vertical sectional view of the main apparatus for schematically illustrating the structure for coupling the apparatus body and the battery unit with each other according to another modification.

The coil springs 53, 53 serve to realize a smooth displacement of the battery unit 15 in the notebook personal computer 11. The notebook personal computer 11 thus suffers from less rattling in the same manner as described above. In addition, even when a relatively large space is defined between the apparatus body 14 and the coupling piece 51, the coil springs 53, 53 serve to prevent the battery unit 15 from rattling as much as possible. A relatively large space thus defined between the apparatus body 14 and the coupling piece 51 leads to establishment of a significant displacement amount of the battery unit 15 as compared with the aforementioned example. As shown in FIG. 11, the elastic pieces 54, 54 may be utilized to couple the coupling piece 51 to the apparatus body 14 in place of the coil springs 53, 53. The elastic pieces 54 may be made of an elastic resin material such as rubber, for example.

Figure 12:
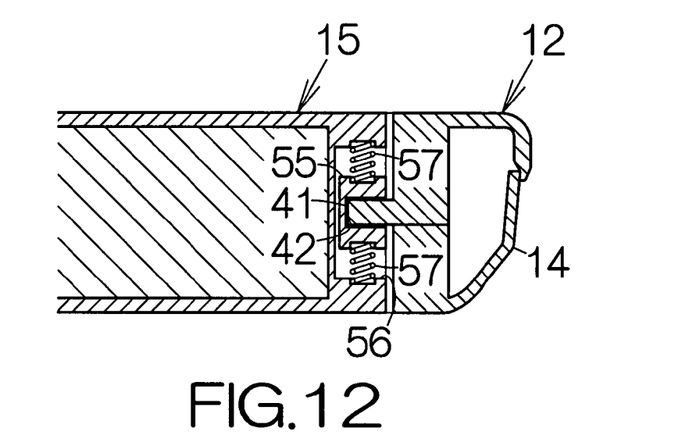
FIG. 12 is an enlarged partial vertical sectional view of the main apparatus for schematically illustrating the structure for coupling the apparatus body and the battery unit with each other according to still another modification.

As shown in FIG. 12, the receiving groove 42 may be formed in a receiving member 55 in the battery unit 15. The receiving member 55 is placed in a void 56 defined in the battery unit 15. Elastic members, such as a pair of coil springs 57, 57, may be utilized to couple the receiving member 55 with the battery unit 15, for example. The coil springs 57, 57 allow the receiving member 55 to move in the void 56. The guiding rail 41 of the apparatus body 14 is received in the receiving groove 42 of the receiving member 55. The attitude of the battery unit 15 can thus be changed relative to the apparatus body 14 based on movement of the coil springs 57, 57. Like reference numerals are attached to the structure or components equivalent to those of the aforementioned example.

Figure 13:
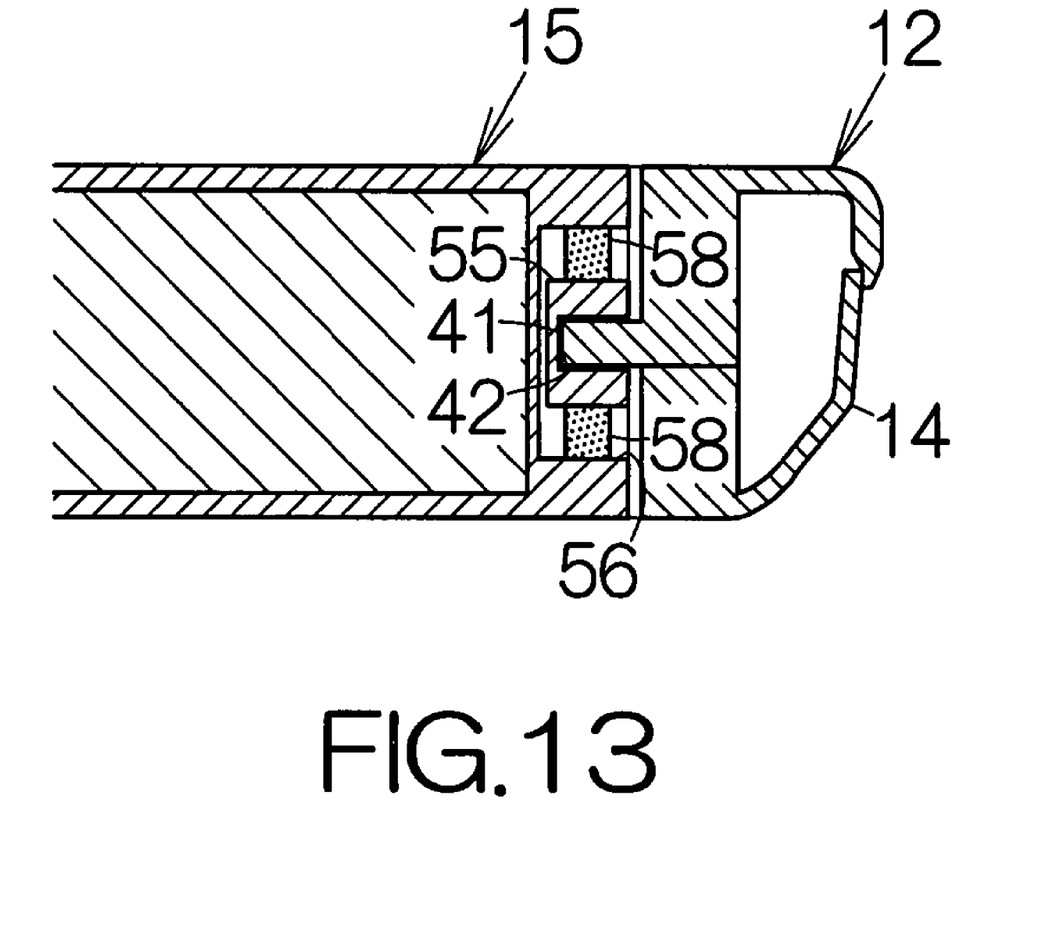
FIG. 13 is an enlarged partial vertical sectional view of the main apparatus for schematically illustrating the structure for coupling the apparatus body and the battery unit with each other according to still another modification.

The coil springs 57, 57 serve to realize a smooth displacement of the battery unit 15 in the notebook personal computer 11. The notebook personal computer 11 thus suffers from less rattling in the same manner as described above. In addition, even when a relatively large space is defined between the battery unit 15 and the receiving member 55, the coil springs 57, 57 serve to prevent the battery unit 15 from rattling as much as possible. A relatively large space thus defined between the battery unit 15 and the receiving member 55 leads to establishment of a significant displacement amount of the battery unit 15 as compared with the aforementioned examples. As shown in FIG. 13, elastic pieces 58, 58 may be utilized in place of the coil springs 57. 57. The elastic pieces 58, 58 may be made of an elastic resin material such as rubber, for example.

It should be noted that the electronic apparatus of the present invention can include an electronic apparatus of any kind other than the notebook personal computer 11, such as a cellular phone terminal, a personal digital assistant (PDA), a tablet personal computer, and the like.

What is claimed is:

1. An electronic apparatus comprising:
   an apparatus body including a pair of support members, the support members respectively defining surfaces opposed to each other;
   a removable unit supported between the surfaces of the support members, the removable unit defining a bottom surface located at a position adjacent to a bottom surface of the apparatus body;
   parallel guiding rails attached to either of opposite sides of the removable unit or the surfaces of the support members;
   parallel receiving grooves formed on a reminder of the opposite sides of the removable unit and the surfaces of the support members, the parallel receiving grooves receiving corresponding ones of the parallel guiding rails, respectively, a predetermined gap or gaps being defined adjacent to each of the guiding rails in the corresponding one of the parallel receiving grooves for allowing the opposite sides of the removable unit to change attitude relative to the surfaces of the support members;
   a first pad disposed on the bottom surface of the apparatus body;
   a pair of second pads disposed on the bottom surface of the removable unit at positions spaced by a predetermined interval;
   a protruding piece disposed in each of the parallel receiving grooves, the protruding piece being engaged with a rear end of a corresponding one of the parallel guiding rails, respectively received in the parallel receiving grooves, for keeping attachment of the removable unit to the apparatus body, the protruding piece being configured to withdraw from a corresponding one of the parallel receiving grooves; and
   an elastic member interposed between the protruding piece and either of the removable unit and the support members, that holds or hold the parallel receiving grooves, the elastic member exerting an elastic force to the protruding piece to hold the protruding piece in the parallel receiving grooves.

2. The electronic apparatus according to claim 1, wherein a keyboard is incorporated in a front surface of the apparatus body.

3. The electronic apparatus according to claim 2, wherein the removable unit serves as a palm rest.

4. The electronic apparatus according to claim 1, wherein the first and second pads are rubber pads.

5. The electronic apparatus according to claim 1, wherein the removable unit is a battery unit.

6. An electronic apparatus comprising:
   an apparatus body including a pair of support members, the support members respectively defining surfaces opposed to each other;
   a removable unit supported between the surfaces of the support members, the removable unit defining a bottom surface located at a position adjacent to a bottom surface of the apparatus body;
   parallel guiding rails formed on either of opposite sides of the removable unit or the surfaces of the support members;
   parallel receiving grooves formed on a reminder of the opposite sides of the removable unit and the surfaces of the support members, the parallel receiving grooves receiving corresponding ones of the parallel guiding rails, respectively; and
   an elastic member exerting an elastic force along a direction perpendicular to the front surface of the apparatus body, the elastic member coupling each of the parallel guiding rails with the either of opposite sides of the removable unit or the surfaces of the support members for allowing the opposite sides of the removable unit to change attitude relative to the surfaces of the support members.

7. The electronic apparatus according to claim 6, wherein a keyboard is incorporated in a front surface of the apparatus body.

8. The electronic apparatus according to claim 7, wherein the removable unit serves as a palm rest.

9. The electronic apparatus according to claim 6, wherein the first and second pads are rubber pads.

10. The electronic apparatus according to claim 6, wherein the removable unit is a battery unit.

11. An electronic apparatus comprising:

an apparatus body including a pair of support members, the support members respectively defining surfaces opposed to each other;

a removable unit supported between the surfaces of the support members, the removable unit defining a bottom surface located at a position adjacent to a bottom surface of the apparatus body;

parallel guiding rails formed on either of opposite sides of the removable unit or the surfaces of the support members;

receiving members supported on a reminder of the opposite sides of the removable unit and the surfaces of the support members, respectively, the receiving members respectively defining parallel receiving grooves respectively receiving corresponding ones of the parallel guiding rails, respectively; and an elastic member exerting an elastic force along a direction perpendicular to the front surface of the apparatus body, the elastic member coupling each of the receiving members with the either of opposite sides of the removable unit or the surfaces of the support members for allowing the opposite sides of the removable unit to change attitude relative to the surfaces of the support members.

12. The electronic apparatus according to claim 11, wherein a keyboard is incorporated in a front surface of the apparatus body.

13. The electronic apparatus according to claim 12, wherein the removable unit serves as a palm rest.

14. The electronic apparatus according to claim 11, wherein the first and second pads are rubber pads.

15. The electronic apparatus according to claim 11, wherein the removable unit is a battery unit.

* * * * *